(12) United States Patent
Mathews, Jr. et al.

(10) Patent No.: US 6,796,080 B1
(45) Date of Patent: Sep. 28, 2004

(54) FISHING LURE

(76) Inventors: Richard S. Mathews, Jr., 2039 SW. 4th St., Lee's Summit, MO (US) 64043; Robert G. Link, 4901 Blue Ridge Blvd., Kansas City, MO (US) 64133

( * ) Notice: Subject to any disclaimer, the term of this patent is extended or adjusted under 35 U.S.C. 154(b) by 0 days.

(21) Appl. No.: 10/325,516

(22) Filed: Dec. 19, 2002

(51) Int. Cl.$^7$ .................................................. A01K 85/00
(52) U.S. Cl. ..................................... 43/42.13; 43/42.11
(58) Field of Search ............................... 43/42.13, 42.11

(56) References Cited

U.S. PATENT DOCUMENTS

| | | | |
|---|---|---|---|
| 2,817,922 A | | 12/1957 | Takeshita |
| 3,504,454 A | * | 4/1970 | Turbeville et al. .......... 43/42.11 |
| 3,546,804 A | * | 12/1970 | Woolums .................... 43/42.11 |
| 3,550,306 A | | 12/1970 | Heitman |
| 3,611,614 A | | 10/1971 | Ward |
| 3,974,323 A | * | 8/1976 | Brouillette et al. .......... 428/457 |
| 4,215,506 A | * | 8/1980 | LeBoeuf .................... 43/42.05 |
| 4,225,647 A | * | 9/1980 | Parent ....................... 428/336 |
| 4,329,804 A | * | 5/1982 | Brown ....................... 43/42.09 |
| 4,425,730 A | * | 1/1984 | Goetz, Jr. ................... 43/42.11 |
| 4,571,877 A | * | 2/1986 | Montgomery .............. 43/42.11 |
| 4,638,586 A | | 1/1987 | Hall |
| 5,024,019 A | * | 6/1991 | Rust et al. .................. 43/42.31 |
| 5,226,268 A | | 7/1993 | Sisson, Jr. |
| 5,400,542 A | * | 3/1995 | Johnson ..................... 43/42.06 |
| 5,412,899 A | * | 5/1995 | Reboul ....................... 43/42.13 |
| 5,605,004 A | | 2/1997 | Boult et al. |
| 5,857,284 A | * | 1/1999 | Gunderson ................. 43/42.13 |
| 5,930,941 A | * | 8/1999 | Hayes, II et al. .......... 43/42.13 |
| 5,946,848 A | | 9/1999 | Ysteboe et al. |
| 5,953,848 A | | 9/1999 | Darnell et al. |
| 5,956,886 A | | 9/1999 | Choate |
| 5,974,723 A | | 11/1999 | Taibi |
| 5,987,805 A | * | 11/1999 | Laney ........................ 43/42.13 |
| 6,041,538 A | | 3/2000 | Roemer |
| 6,112,451 A | | 9/2000 | Webb |
| H1865 H | | 10/2000 | Aoki |
| 6,155,000 A | * | 12/2000 | Ravencroft ................ 43/42.31 |
| 6,266,914 B1 | * | 7/2001 | Johnson et al. ............ 43/42.13 |
| 6,481,149 B1 | * | 11/2002 | Hall et al. .................. 43/43.16 |
| 2001/0042336 A1 | | 11/2001 | Johnson et al. |

FOREIGN PATENT DOCUMENTS

| | | | | |
|---|---|---|---|---|
| JP | 2000300118 A | * | 10/2000 | ......... A01K/85/00 |
| WO | WO 9824309 | * | 6/1998 | ......... A01K/85/00 |

* cited by examiner

Primary Examiner—Robert P. Swiatek
Assistant Examiner—Joan M. Olszewski
(74) Attorney, Agent, or Firm—Shughart Thomson & Kilroy P.C.

(57) ABSTRACT

A fishing lure includes a yoke having divergent first and second arms. The first arm is formed of wire, which is preferably nickel-titanium alloy wire having a memory characteristic, having a bright formed at one end for attachment of a fishing line. The second arm is formed of a plastic material and has a first end molded around a portion of the first arm proximate the bight. A weighted body having a fishhook attached thereto is connected a second end of the second arm. A fish attracting element such as a spinner blade or propellor is rotatably mounted on the first arm. The weighted body may include a central core of heavy dense material and an encapsulating outer layer of plastic material which is integrally molded with the second arm. The plastic material forming the second arm is preferably transparent or colored so as to be invisible to fish.

21 Claims, 2 Drawing Sheets

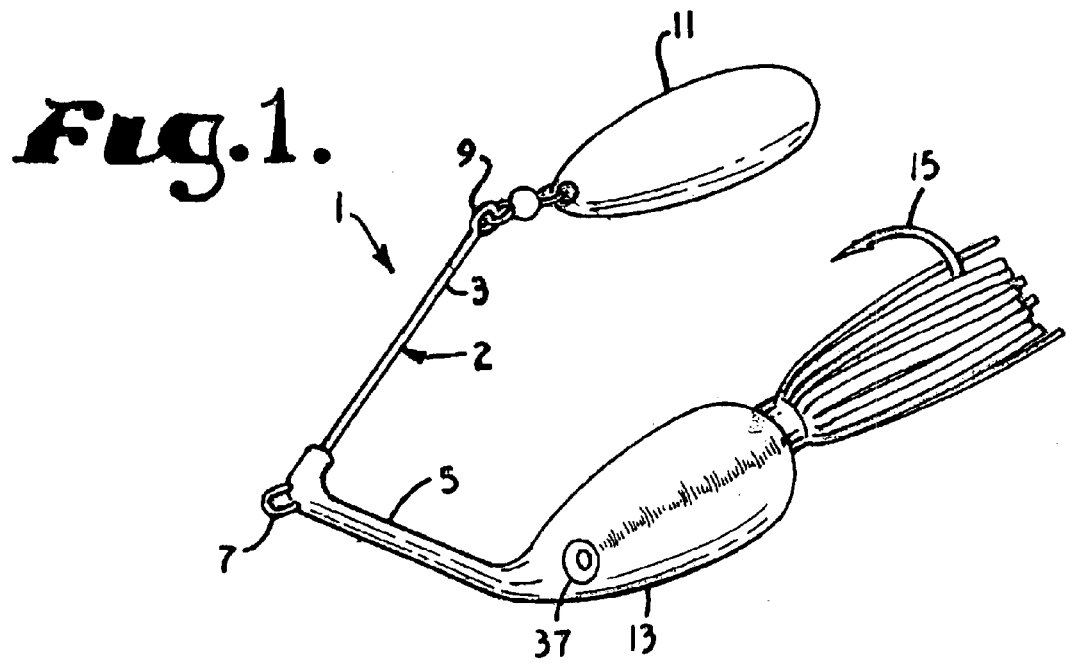
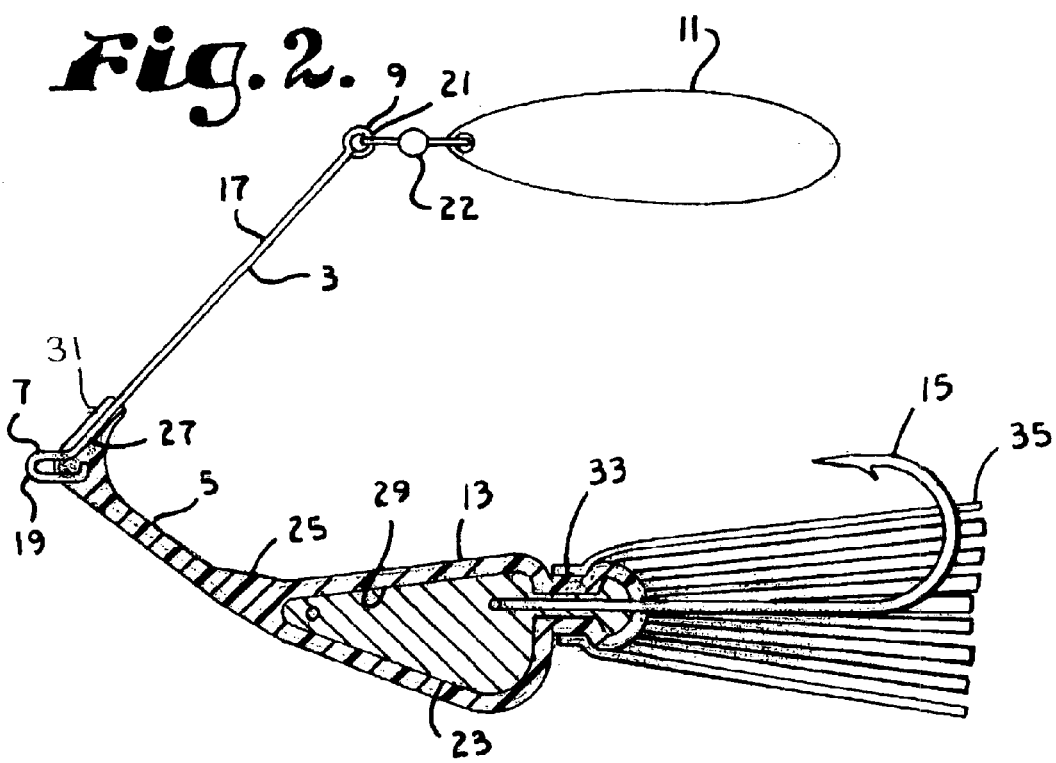

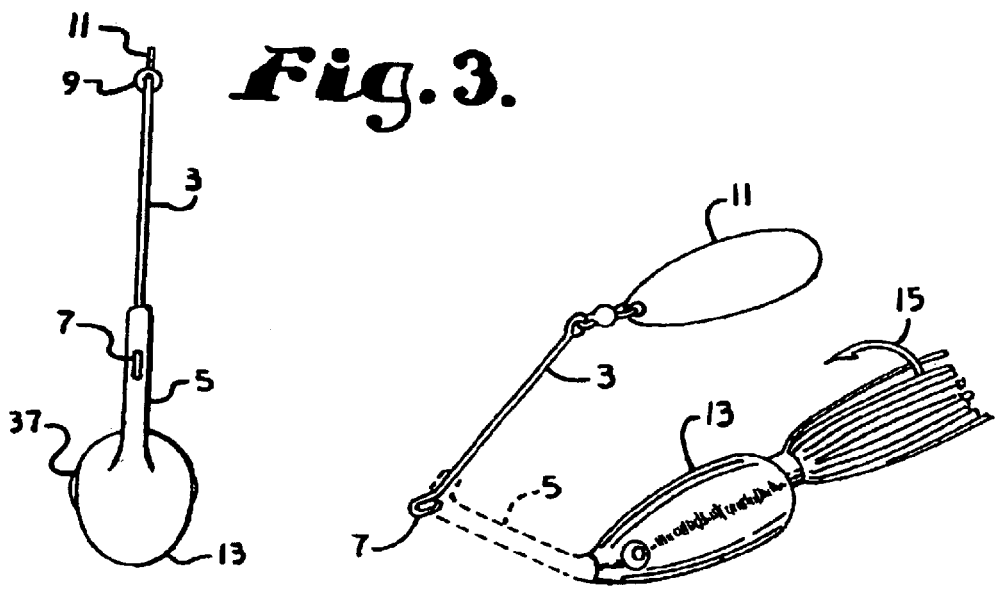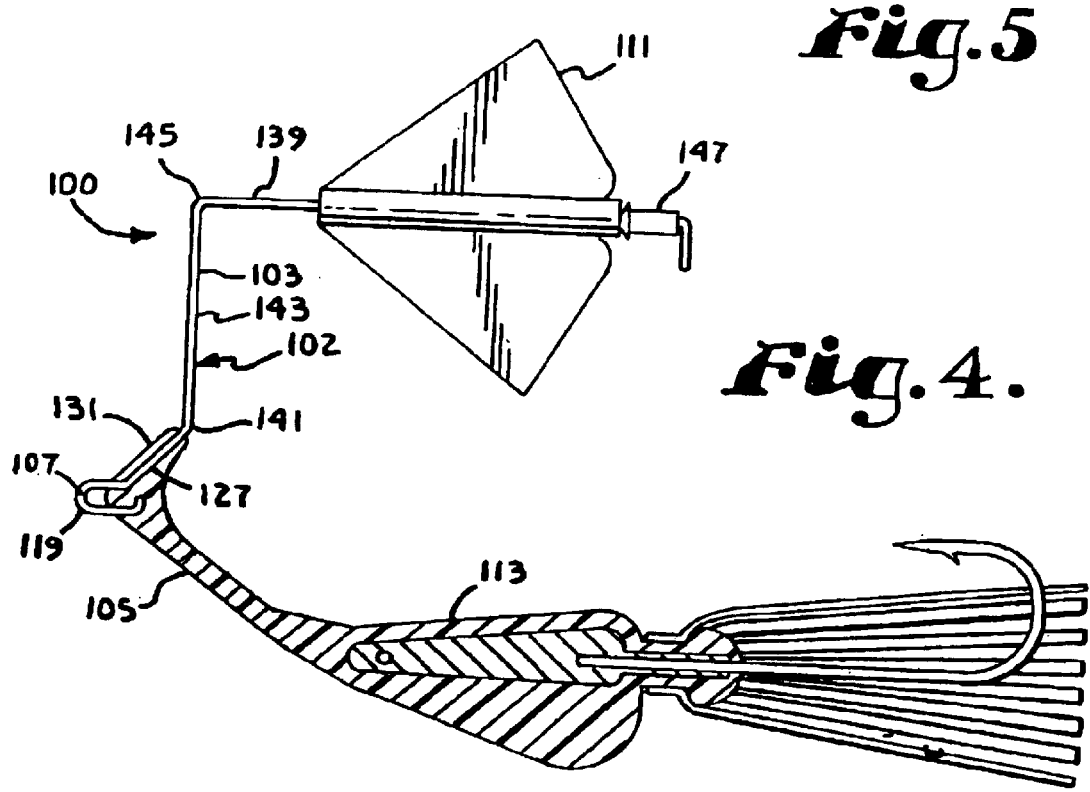

US 6,796,080 B1

FISHING LURE

BACKGROUND OF THE INVENTION

1. Field of the Invention

This invention relates to the field of artificial fishing lures, and in particular to lures of the spinner bait or buzz bait type.

2. Description of the Related Art

Fishing lures of the spinner bait and buzz bait types are well known in the fishing art. A common type of spinner bait comprises a wire yoke having a pair of divergent arms with a loop or bight formed at their point of connection for attaching a fishing line. One of the arms terminates in a body designed to imitate a bait fish or other food item. The body is generally formed of lead and has at least one fishhook attached thereto for capturing a fish which strikes at the lure body. The other arm terminates in a loop to which a spinner blade is attached. The spinner blade rotates as the lure is pulled through the water so as to reflect light and create noise. The motion of the spinner blade acts to attract fish toward the lure body. A buzz bait type lure is similar to the spinner bait except that the spinner blade is replaced with a propeller.

Numerous references disclose improvements to the standard spinner bait. For example, U.S. Pat. No. 4,571,877 to Montgomery discloses a lure wherein the body is mounted on a substantially rigid arm, whereas the arm to which the spinner blade is attached is non-rigid. U.S. Pat. No. 4,638,86 to Hall discloses a lure with a plastic sleeve which covers a major portion of the weighted lure body. U.S. Pat. No. 5,953,848 to Darnell et al. discloses an "environmentally friendly" lure wherein the body is formed of a weighted mass of non-toxic metallic pellets encapsulated in plastic. U.S. Pat. No. 6,266,914 to Johnson, et al. discloses a lure wherein the yoke or frame (including both arms) is made of nickel-titanium alloy wire. U.S. Pat. No. 5,987,805 to Laney discloses a buzz bait lure wherein the body has wing structures which cause the lure to rise as it is pulled through the water.

Prior art lures with wire yokes suffer from several known problems. One of these problems is that such lures can become ineffective in clear water because the fish can see the wire arm connected to the lure body. The fish recognize the wire arm as a danger sign and are less likely to strike at the bait.

Another problem with conventional spinner and buzz baits is that the wire arms tend to break where the wire enters the lead body. This breakage occurs for two reasons. First, when the melted lead is molded around the wire arm it is at a temperature of approximately 800 to 900 degrees Fahrenheit. This high temperature tends to take the temper out of the wire and thereby weakens it. Secondly, as the lure is used, the wire arm tends to bend repeatedly at the same point adjacent the lure body. This results in fatigue of the wire and its eventual failure.

A third problem with traditional wire yoke spinner bait lures is that because both arm of the yoke are flexible, the yoke tends to absorb a significant part of the vibration created by the spinner blade. This is undesirable because it dampens the noise which is generated by the lure.

What is needed is a spinner bait type lure having an improved yoke which eliminates the aforementioned deficiencies of the prior art all-wire yoke.

SUMMARY OF THE INVENTION

The present invention comprises a fishing lure having a yoke with a first arm made of wire, and a second arm molded of plastic material, such as polycarbonate, which is preferably transparent. The first arm is preferably nickel-titanium alloy wire having a memory characteristic and has a loop or bight formed at one end for attachment of a fishing line. The second arm has a first end molded around a portion of the first arm proximate the loop. A weighted body having a fishhook attached thereto is connected to a second end of the second arm. The weighted body may include a central core of heavy dense material and an encapsulating outer layer of plastic material which is integrally molded with the second arm. A fish attracting element such as a spinner blade or propellor is rotatably mounted on the first arm.

BRIEF DESCRIPTION OF THE DRAWINGS

FIG. 1 is a perspective view of a spinner bait type fishing lure comprising a first embodiment of the present invention.

FIG. 2 is a cross sectional view of the lure of FIG. 1 taken generally along a longitudinal centerline of the lure.

FIG. 3 is a front view of the lure of FIG. 1.

FIG. 4 is a view similar to FIG. 2 showing a buzz bait type fishing lure comprising a second embodiment of the present invention.

FIG. 5 is a view similar to FIG. 1 showing an arm of the lure in dashed lines to indicate that the arm is formed of transparent material.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Spinner Bait

Referring to the drawings in more detail, the reference number 1 generally designates a spinner bait lure embodying the present invention. As is conventional for spinner baits, the lure 1 generally includes a yoke 2 having divergent first and second arms 3 and 5, respectively, which are joined together at an apex having a first loop or bight 7 for attachment of a fishing line (not shown). The first arm 3 extends outwardly to a second loop 9 for attachment of a spinner blade 11. The second arm 5 extends outwardly to a weighted body 13 having a hook 15 attached thereto. Unlike conventional spinner baits, however, the yoke 2 is not formed of a single length of wire. Instead, only the first arm 3 is formed of wire, while the second arm 5 is formed of plastic which is molded around a portion of the first arm 3. The second arm 5 is also integrally molded with the body 13.

The first arm 3 is preferably formed from a length of wire 17 having a memory characteristic, such as nickel-titanium alloy wire (NiTi), however other types of wire including stainless steel can also be used. The first arm 3 may be either generally straight or bent to a predetermined shape. The first loop 7 is formed in a first end 19 of the first arm 3, and the second loop 9 is formed in a second end 21 of the first arm 3. The spinner blade 11 is connected to the second loop 9 by a swivel 22.

The body 13 includes a weight 23 formed of heavy, dense material, such as lead or thermoplastic resin that has been modified to increase its specific gravity over 2.0 g/cubic cm. The weight 23 may be molded around the shank of the hook 15 such that the hook 15 is secured to the weight 23 and extends outwardly therefrom. Alternatively, the weight 23 can be a drop-in weight which is not connected to the hook 15.

The weight 23, hook 15 and the wire forming the first arm 3 are placed in an injection mold where thermoplastic resin 25 is molded around the hook 15, weight 23 and a first portion 27 of the first arm 3 proximate the first end 19 thereof. The plastic resin 25 is molded to integrally form the second arm 5, an outer layer 29 around the weight 23 (which forms a part of the body 13), and a sleeve 31 which surrounds the portion 27 of the arm 3 and thereby connects the second arm 5 to the first arm 3. A portion of the first loop or bight 7 of the first arm 3 extends outwardly from the plastic material 25 such that the line may be attached thereto.

If a drop-in weight 23 separate from the hook 15 is used, the weight 23 is held in place by core pins until the resin 25 has flowed around the weight 23 and filled 95–99% of the mold cavity. The core pins are then retracted and the flowing plastic 25 will fill the voids left by the core pins and completely encapsulate the weight 23.

The resin 25 is preferably polycarbonate (PC), however other resins which may also be used, alone or in combination, include: Acrylonitrile Butadiene Styrene (ABS), Acrylic, Polymethyl Methacrylate (PMMA), Acrylic+Polycarbonate (Acrylic+PC), Tenite Acetate (CA), Tenite Butyrate (CAB), Tenite Propionate (CAP), Ethylene Tetrafluoroethylene (ETFE), Engineering Thermoplastic Polyurethane (ETPU), Ethylene Vinyl Alcohol Copolymer (EVOH), Methylmethacrylate Butadiene Styrene (MBS) Polyamide (Nylon), Polyamide 12 (Nylon 12), Polyamide 6 (Nylon 6), Polycarbonate+Polyethylene Terephthalate (PC+PET), Polycarbonate+Polyester, PCTA, PCTG, Polyarylate, Polyester Alloy, Polyester TP, Polyolefin, Polyphthlate Carbonate (PPC), Polystyrene (PS, GPPS), Polysulfone (PSU), Flexible Polyvinyl Chloride (Flexible PVC), Rigid Polyvinyl Chloride (Rigid PVC), Polyvinylidene Fluoride (PVDF), Styrene Acrylonitrile (SAN), Styrene Butadiene Block Copolymer (SB), Thermoplastic Elastomer (TPE), Thermoplastic Polyurethane Elastomer Polyether (TPU-Polyether), or numeroush other unspecified thermoplastics.

It should be noted that the temperature at which polycarbonate plastic is molded is in the range of 520 to 550 degrees Fahrenheit. This temperature is considerably lower than the melting temperature of lead, therefore the method of making the lure of the present invention is far less likely to weaken the wire 17 than would be the case if the wire 17 were molded into the weight 23 as is done in the making of conventional lures.

The plastic forming the second arm 5 is preferably transparent (as represented by the dashed lines in FIG. 5) or colored so as to be substantially invisible in a body of water, whereas the portion forming the outer plastic layer 29 of the body 13 is preferably colored or painted so as to be visible. This allows the fish to see the body 13, but not the second arm. This "visual disconnect" between the lure body 13 and the first arm 3 will fool fish that have become conditioned to avoid standard wire frame spinner baits because the vital visual clue that allows the fish to distinguish between bait fish and artificial lures (the visible link connecting the body 13 to the first arm 3) is missing. In the molding process, it is noted that polycarbonate typically has a yellowish tint. A blue colorant may be added such that the resulting molded plastic is generally clear.

The thermoplastic second arm 5 is also more rigid than the wire arms used in prior art lures. In the prior art devices, the wire second arm will flex and elongate during hook set, causing a delay before the hook penetrates. The thermoplastic second arm 5 eliminates the delay by eliminating the elongation. The hook 15 will thus set solidly and fewer fish will escape without being hooked.

Wire frame spinner baits are also notorious for breaking directly in front of the body because this is where most of the flexing occurs. The plastic second arm 5 of the present invention is less susceptible to fatigue breakage because it is more rigid and will not flex as far or as often. Thus, even though the plastic resin 25 has a lower fatigue limit than titanium wire, the rigidity of the second arm 5 will not allow it to flex far enough or frequently enough to permit fatigue breakage to occur.

The first arm 3, which is formed of wire, is also supported and made more rigid by the thermoplastic sleeve 31 which surrounds the portion 27 of the arm 3. This will allow the use of a smaller diameter wire 17 than is used in prior art lures. The use of smaller diameter wire 17 is advantageous because it is both less expensive and less visible to fish. The extra support provide by the sleeve 31 also allows the use of a larger spinner blade 11.

The outer plastic layer 29 of the body 13 preferably completely encapsulates the weight 23. This is particularly important if the weight 23 is made of toxic material such as lead. By encapsulating the lead, the outer plastic layer 29 prevents the lead from entering the environment where it can be consumed by fish, waterfowl and other wildlife.

The body 13 is preferably painted or otherwise colored to resemble the body of a bait fish or to at least catch the attention of a fish. The body 13 includes an annular groove 33 which surrounds the shank of the hook 15. The groove 33 accepts a skirt 35 which hides the hook 15 and gives the body 13 a more lifelike appearance. The body 13 also includes a pair of artificial eyes 37 which give the body 13 the appearance of prey. The body is shaped such that water passing over, under, and around its features will generate vibrations that mimic the vibrations of a swimming bait fish.

Buzz Bait

"A buzz bait version 100 of the lure of the present invention is shown in FIG. 4. The lure 100 is similar to the lure 1 in that it includes a yoke 102 having a first arm 103 of nickel-titanium alloy wire and a second arm 105 of plastic and a sleeve 131 molded around a first portion 127 of the first arm 103. The second arm 105 is integrally molded with an outer portion of a weighed body 113 and is preferably transparent. The first arm 103 of the lure 100 includes a first end 119 having a first loop 107 for attaching a fishing line to the lure 100."

The lure 100 differs from the lure 1 in that the lure 100 includes a pinwheel or propeller 111 mounted on the first arm 103 in place of the spinner blade 11. The propeller 111 rotates about an axis of rotation defined by a second portion 139 of the first arm 103 as the lure 100 is pulled through the water.

The first arm 103 of the lure 100 is also shaped differently from the first arm 3 of the lure 1 in order to bring the axis of rotation of the propellor 111 into generally parallel alignment with the direction of travel of the lure 100. The first arm 103, therefore, includes a first bend 141 proximate the outer end of the sleeve 131 which is selected to orient a third portion 143 of the first arm 103 intermediate the first and second portions at an angle generally perpendicular to the direction of travel of the lure. A second bend 145 between the second and third portions of the first arm 103 is a right angle bend which places the second portion 139 parallel to the direction of travel.

The propeller 111 is placed on the second portion 139 of the first arm 103 such that it is free to rotate thereabout. A thrust bearing 147 is also placed on the second portion 139 of the first arm 103 rearwardly of the propeller 111 to facilitate rotation of the propellor 111 as the lure is pulled through the water. The first arm 103 is then bent sharply rearward of the bearing 147 to retain the bearing 147 and propellor 111 on the arm 103.

It is to be understood that while certain forms of the present invention have been illustrated and described herein, it is not to be limited to the specific forms or arrangement of parts described and shown. For example, while the body 13 has been disclosed herein as including a discreet weight 23 formed of heavy, dense material, such as lead, it is to be understood that the body 13 could also be formed using pellets or particles of heavy, dense material dispersed throughout the body 13 within a matrix of plastic material. It is to be understood that in some aspects of the invention the relative density of the body 13 is not critical or intended to be limiting. The plastic material forming the body 13 could be integrally molded with the second arm 5.

What is claimed and desired to be secured by Letters Patent is as follows:

1. A fishing lure comprising:
   a) a yoke having divergent first and second arms, said first arm being formed of wire and having a first end forming a first loop, said second arm being formed of a plastic material and having a first end molded around a first portion of said first arm proximate said first loop with the plastic material of the molded end being the sole connection between the first and second arms;
   b) a body connected to a second end of said second arm;
   c) a fishhook connected to said body; and
   d) a fish attracting element rotatably mounted on said first arm.

2. The fishing lure as in claim 1 wherein said second arm is transparent.

3. The fishing lure as in claim 1 wherein said body includes a central core of heavy dense material and an encapsulating outer layer of plastic material.

4. The fishing lure as in claim 3 wherein said second arm and said outer layer of said body are integrally molded.

5. The fishing lure as in claim 1 wherein said first arm is formed of nickel-titanium alloy wire having a memory characteristic.

6. The fishing lure according to claim 1 wherein a second loop is formed at a second end of said first arm and said fish attracting element is a spinner blade connected to said second loop by a swivel.

7. The fishing lure according to claim 1 wherein said fish attracting element is a propellor rotatably mounted on a second portion of said first arm, said second portion being oriented generally parallel to a direction of travel of the lure.

8. The fishing lure according to claim 1 and further comprising a skirt connected to said body to conceal said fishhook.

9. A fishing lure comprising:
   a) a yoke having divergent first and second arms, said first arm being formed of wire and having a first end forming a bight, said second arm being formed of a plastic material and having a first end molded around a first portion of said first arm proximate said bight with the plastic material of the molded end being the sole connection between the first and second arms;
   b) a weighted body comprising a core of heavy material and an outer layer, said outer layer being molded of said plastic material Integrally with said second arm;
   c) a fishhook connected to said weighted body; and
   d) a fish attracting element rotatably mounted on said first arm.

10. The fishing lure according to claim 9 and further comprising a skirt connected to said body to conceal said fishhook.

11. The fishing lure as in claim 9 wherein the plastic material forming said second arm is transparent.

12. The fishing lure as in claim 9 wherein said first arm is formed of nickel-titanium alloy Are having a memory characteristic.

13. The fishing lure according to claim 9 wherein a loop is formed at a second end of said first arm and said fish attracting element is a spinner blade connected to said second loop by a swivel.

14. The fishing lure according to claim 9 wherein said fish attracting element is a propellor rotatably mounted on a second portion of said first arm, said second portion being oriented generally parallel to a direction of travel of the lure.

15. A fishing lure comprising:
   a) a yoke having divergent first and second arms, said first arm being formed of wire and having a first end, said second arm being formed of a plastic material and having a first end molded around a first end of said first arm with the plastic material of the molded end being the sole connection between the first and second arms;
   b) a body connected to a second end of said second arm;
   c) a fishhook connected to said body; and
   d) a fish attracting element rotatably mounted on said first arm.

16. The fishing lure as in claim 15 wherein said second arm is transparent.

17. The fishing lure as in claim 15 wherein said body includes a central core of heavy dense material and an encapsulating outer layer of plastic material.

18. The fishing lure as in claim 17 wherein said second arm and said outer layer of said body are integrally molded.

19. The fishing lure as in claim 15 wherein said first arm is formed of nickel-titanium alloy wire having a memory characteristic.

20. The fishing lure according to claim 15 and further comprising a skirt connected to said body to conceal said fishhook.

21. A fishing lure comprising:
   a) a yoke having divergent first and second arms, said first arm being formed of wire and having a first end forming a first loop, said second arm being formed solely of a transparent plastic material and having a first end molded around a first portion of said first arm proximate said first loop;
   b) a body connected to a second end of said second arm;
   c) a fishhook connected to said body; and
   d) a fish attracting element rotatably mounted on said first arm.

* * * * *